3,370,012
DIELECTRIC COMPOSITION OF A MIXTURE OF DIARYL SULFONES

William David Robinson, Newark, Del., assignor to E. I. du Pont de Nemours and Company, Wilmington, Del., a corporation of Delaware
No Drawing. Filed June 2, 1965, Ser. No. 460,856
1 Claim. (Cl. 252—63.7)

ABSTRACT OF THE DISCLOSURE

A diaryl sulfone composition prepared from a mixture of 45–65% by weight ethylbenezene, 55–35% by weight xylene in the presence of a sulfonation reagent. The compositions have an unexpectedly low pour point.

---

This invention is directed to a normally liquid diaryl sulfone composition consisting essentially of a mixture of sulfones obtained from (1) xylene and (2) ethylbenzene.

Pure dixylyl sulfones are normally solids. As such, they are inconvenient to handle or blend in various applications as plasticizers and dielectric materials. In the electrical industry, it is especially advantageous to use a dielectric which is liquid at the normal operating temperature of the apparatus, e.g. capacitor. In addition, it is desirable to apply the dielectric directly in the preparation of the capacitor, obviating the necessity of heating.

It is known that liquid diaryl sulfone mixtures may be obtained by following the method of preparation described in U.S.P. 2,556,429; by this process, a mixture of $C_8$ aromatic hydrocarbons containing about 5–20% ethylbenzene and specified xylene isomers is converted to a liquid sulfone mixture. The product mixture obtained by this process is disclosed as being liquid at 75–90° F. (23.9–32.2° C.). The reason for the product being liquid is attributed to the selectivity of the reaction to o-xylene. A sulfone mixture obtained from equimolar amounts of commercial xylene and technical grade toluene sulfonic acid was a viscous oil at room temperature but had a tendency to crystallize.

U.S.P. 2,556,429 teaches that the xylene feed stock used for the preparation of a liquid sulfone product must contain more than 5% o-xylene and/or ethylbenzene. Amounts up to 20% are shown to be satisfactory. No information is given on effect of amounts larger than 20% of ethylbenzene. The lowest pour point disclosed is 75° F. (23.9° C.).

It is an object of this invention to provide a normally liquid dixylyl sulfone product having a low pour point temperature of 10°–15° C., which product can be easily handled and blended. It is a further object to provide such a product which is essentially a mixture of sulfones obtained from xylene and ethylbenzene.

These and other objects of the invention will be apparent from the following description and claims.

More specifically, the present invention is directed to a normally liquid mixture of diaryl sulfones consisting essentially of 45–65% by weight of bis(ethylphenyl)sulfone and 55–35% by weight of dixylyl sulfone. A preferred embodiment is such a mixture obtained from a mixture of 45–65% by weight of ethylbenzene and 55–35% by weight of mixed technical xylene by a sulfonation process.

It has been discovered that a specified mixture of sulfones has an exceptionally low pour point. The melting points of the individual sulfones are high; they are all solids at room temperature. Although it is known that mixtures show depressions in melting points, the extent of such depression cannot be predicted. In the case of the diaryl sulfones of the present invention, it is surprising that the melting point (or pour point) is depressed to such a degree. A region of minimum pour point temperature has been discovered which affords greater applicability than hitherto known compositions.

The sulfone mixture is especially useful as a capacitor fluid. These sulfones have an excetpionally high dielectric constant (22) vs. that of the chlorinated diphenyls (4–6) now used. This high dielectric constant plus a low dissipation factor (chlorinated diphenyl also low, however) combine to make the sulfones a highly desirable dielectric fluid—if it could be made fluid, which applicant did. The advantage of the higher dielectric constant is that the size of the capacitor may be reduced, in this case to about one-third.

In addition, the sulfones have a much lower toxicity. The chlorinated diphenyls are fairly toxic.

The following Table I gives the melting points of the sulfones prepared from commercially available 3° xylene mixture and each xylene isomer.

TABLE I
[Melting points of xylene isomer mixtures]

| Ortho, percent | Meta, percent | Para, percent | M.P., ° C. |
|---|---|---|---|
| 12 | 57 | 27 | 88 |
|  | 100 |  | 122 |
| 100 |  |  | 148–150 |
|  |  | 100 | 145 |

Bis(ethylphenyl)sulfone melts at about 65° C.

The following Table II shows the depressions in pour points of blends of product prepared from the isomers of xylene.

TABLE II
[Melting points of blends of products preapared from pure isomers of xylene]

| Percent Ortho | Percent Meta | Percent Para | Pour Point, ° C.¹ |
|---|---|---|---|
| 13 | 70 | 17 | 85 |
| 13 | 60 | 27 | 85 |
| 13 | 50 | 37 | 85 |
| 7.5 | 60 | 32.5 | 85 |
| 18 | 60 | 22 | 85 |
| 50 | 50 |  | 95 |
|  | 51 | 49 | 95 |
| 50 |  | 50 | 110 |
| 28 | 72 |  | 95 |

¹ To the nearest 5° C.

The following Chart I illustrates the effect of the amount of ethylbenzene on the pour point of the sulfone mixture obtained.

CHART I

Four points of mixed diaryl sulfones prepared from ethylbenzene-xylene mixtures:

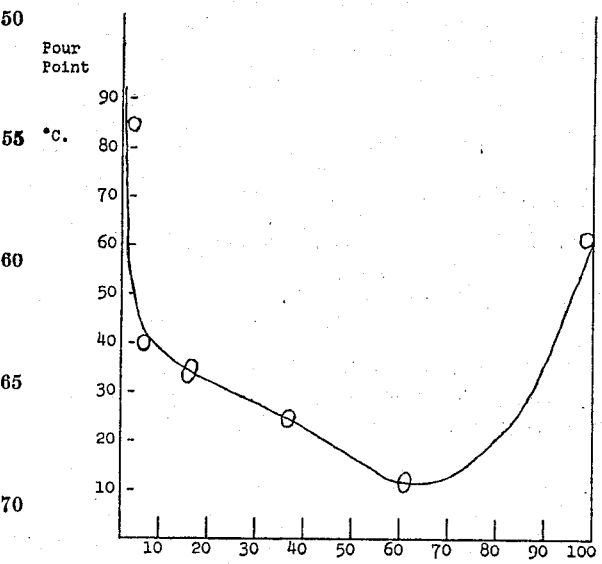

Weight percent ethylbenzene

The following Chart II illustrates the effect of blending the individual sulfones on the pour point of the sulfone mixture obtained.

CHART II

Pour points of mixtures of dixylyl sulfones and bis(ethylphenyl)sulfone:

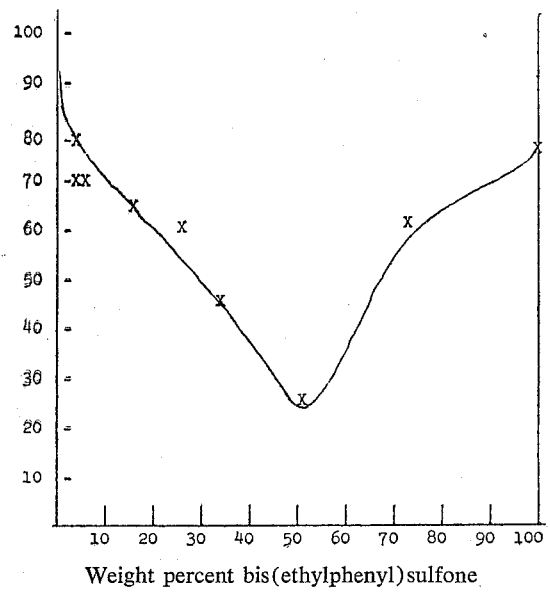

Weight percent bis(ethylphenyl)sulfone

The composition of the novel diaryl sulfone mixture possessing the uniquely low pour point consists essentially of 45–65% by weight of bis(ethylphenyl)sulfone and 55–35% by weight of dixylyl sulfone.

It is most conveniently obtained by directly preparing the sulfones from a mixture of xylene and ethylbenzene. Any method of preparation may be used, for example, as described in U.S. 3,125,604, wherein an aryl sulfonic acid is reacted with an aryl hydrocarbon in the presence of $PCl_5$ or $POCl_3$, a Friedel-Crafts catalyst is added, the reaction mass is further heated and the diaryl sulfone product is recovered.

As can be seen from Chart II, blending dixylyl sulfone with bis(ethylphenyl)sulfone results in a slightly higher melting composition.

The xylene used in the preparation of the sulfone may be the pure ortho-, meta- or para-isomer, or it may conveniently be a commercially available mixture of isomers. The isomer distribution of commercial xylene varies from time to time; the 3° xylene commonly sold at present contains about 10–15% o-xylene, 70–55% m-xylene and 20–30% p-xylene by weight. Some xylene compositions also contain a small amount of ethylbenzene, up to about 7%, by weight, and up to about 3% of toluene, by weight. In this case the amount of ethylbenzene used to prepare the sulfone mixture is adjusted proportionately.

The liquid diaryl sulfone mixture thus obtained is a glass-like fluid, liquid at temperatures from about 10° to 15° C. and shows no tendency to crystallize.

The following example is representative and illustrates the preparation of a liquid diaryl sulfone mixture from 60% by weight ethylbenzene and 40% by weight mixed xylenes.

*Example I*

A flask equipped with a reflux condenser was charged with 112 g. 3° xylene, which consisted of 12 weight percent, o-xylene, 68 weight percent m-xylene and 20 weight percent p-xylene, and 168 g. ethylbenzene. 140 g. chlorosulfonic acid was added at 20°–25° C. over ½ hour with agitation. The mixture was heated to 70° C. and 92.5 g. phosphorus oxychloride was added over a period of ½ hour. The charge was heated to reflux (approximately 145° C.) over 1 hour, and held at this temperature for 8 hours. The reaction mass was cooled to 100° C. 12 g. $FeCl_3$ (anhydrous), 112 g. 3° xylene and 168 g. ethylbenzene were added and the charge reheated to reflux and maintained for 4 hours. The reaction mass was cooled, washed with 150 cc. water, then with dilute caustic solution and again with water. The excess hydrocarbon was distilled off at 145° C., 10 mm. Hg. The product was a black liquid, which after distillation at 185°–220° C., 2 mm. Hg., yielded 305 g. of a pale yellow liquid. The mixed liquid dixylyl-bis(ethylphenyl)sulfone thus obtained had a density of 1.14 g./ml. at 25° C., a pour point of 10° C., dielectric constant, $\epsilon'=22$ and a dissipation factor, $\tan \delta = <0.002\%$.

The dixylyl-bis(ethylphenyl)sulfone mixtures of the present invention, in addition to being fluid at 10°–15° C., have high dielectric constants, $\epsilon'=22$ and low dissipation factors, $\tan \delta = <0.002\%$. These fluids are also characterized by relatively small changes in viscosity with respect to temperature changes. For example, the following Table III shows the viscosity, $\eta$, in centipoises, of sulfone products obtained from xylene-ethylbenzene mixtures of varying proportions.

TABLE III

| Weight Percent Ethylbenzene | Viscosity, cps. | |
|---|---|---|
| | 60° C. | 100° C. |
| 5 | 600,000 | 2,300 |
| 20 | 31,000 | 1,800 |
| 45 | 14,000 | 1,300 |
| 65 | 8,100 | 1,050 |

Thus it can be seen that in the range of 45–65% ethylbenzene content of starting material, the viscosity of the resulting mixed sulfone product changes 10 to 8 fold as the temperature decreases from 100° C. to 60° C., while the viscosity of the sulfone product from 5–20% ethylbenzene changes from 30–20 fold, with corresponding temperature change.

The preceding respresentative Example may be varied within the scope of the present total specification disclosure, as understood and practiced, by one skilled in the art to achieve essentially the same results.

As many apparently widely different embodiments of this invention may be made without departing from the spirit and scope thereof, it is to be understood that this invention is not limited to the specific embodiments thereof.

The embodiments of the invention in which an exclusive property or privilege is claimed are as follows:

1. A normally liquid mixture of diaryl sulfones comprising 45–65% by weight of bis(ethylphenyl)sulfone and 55–35% by weight of dixylyl sulfone.

References Cited

UNITED STATES PATENTS 3,125,605   3/1964   Buchner et al. _____ 260—635
2,556,429   6/1961   Lee _____ 260—607

LEON D. ROSDOL, *Primary Examiner.*

JOHN D. WELSH, *Assistant Examiner.*